Patented May 29, 1934

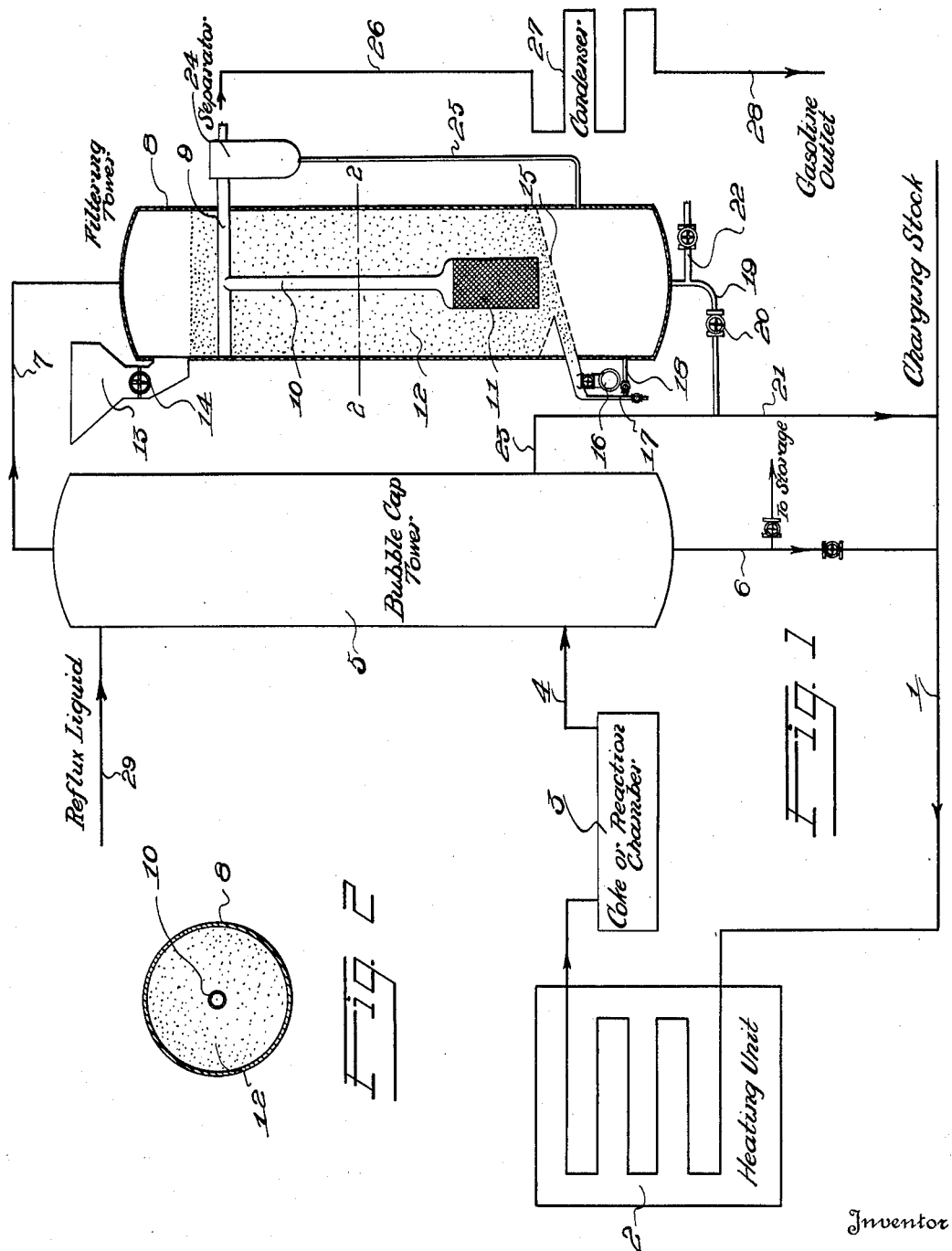

1,960,561

UNITED STATES PATENT OFFICE 1,960,561

PROCESS FOR DECOLORIZING AND DE-SULPHURIZING HYDROCARBON VAPORS

James M. Wadsworth, Sand Springs, Okla.

Application October 1, 1926, Serial No. 138,864

2 Claims. (Cl. 196—96)

This invention relates to an improved process and apparatus for decolorizing hydrocarbon vapors or for separating the polymers from such vapors. It also relates to a novel process and apparatus for desulphurizing such vapors.

In this invention, gasoline or other hydrocarbon vapors undergoing treatment are passed through fuller's earth or similar material, which condenses and separates the sulphur, polymers of other coloring matter contained therein, and thus produces a gasoline or other product free of polymers or sulphur, which is more stable to light and consequently of better marketing value. In my system, the vapors are passed first downwardly through the fuller's earth or the like and then upwardly through a conduit, from which any condensate may gravitate downwardly into the fuller's earth or the like to be filtered thereby.

The invention is illustrated in the accompanying drawing, in which

Fig. 1 is a diagrammatic view of a gasoline cracking plant connected with my improved filtering tower, the latter being shown in vertical section.

Fig. 2 is a horizontal sectional view taken on line 2—2 of Fig. 1.

In the following detail description, I will first describe the process and apparatus used for decolorizing hydrocarbon vapors.

In the drawing, it may be seen that the gas oil or charging stock is pumped by way of the line 1 through the heating unit 2, into the coke or reaction chamber 3. The vapors and gases from this chamber pass by way of pipe 4 into a rectifying column 5, which in practice, is preferably of the bubble cap type. The material which is not vaporized in chamber 3 may be discharged from said chamber in any suitable manner and may be used for fuel. Vaporization takes place in this tower and as the vapors pass upwardly some of them are condensed and this condensate flows downwardly counter current to the vapors, the reflux or condensate passing out at the bottom through a pipe 6 to storage or back into the pipe 1 for re-cycling. The vapors and uncondensed gas pass out of the top of the tower 5 by way of the pipe 7 into the top of the filtering tower 8. This tower is of special construction and is provided internally with a cross pipe 9 from which a vertical pipe 10 depends. The lower end of the vertical pipe is enlarged and provided with a grating or screen 11 to prevent the fuller's earth or other filtering material 12 within the column from entering said pipe, while permitting free entrance of vapors and gases into the pipe 10.

The filtering material may be fed into the tower by means of a hopper 13 having a control valve 14. Arranged within the tower and spaced from the bottom of the same, is a cone-shaped false bottom 15, preferably formed of suitable perforated material to permit drainage into the lower end of the tower.

An outlet for the filtering material is shown at 16, and steam for cleaning the filtering material may be introduced into the tower by way of pipe 17 having a branch 18.

A conduit 19 is connected to the lower end of the tower 12 and is provided with a valve 20 by means of which polymers or other condensates from the tower 8, may be fed into the feed line 1 through pipe 21. If these polymers or condensates are not to be re-cycled, they may be discharged by means of the valved pipe 22.

A conduit 23 connects the pipe 21 to an intermediate portion of the rectifier 5, so that condensate from a point, higher up than the bottom of the tower 5, may be re-cycled.

The pipe 9 is connected to a separator 24 having a condensate drain pipe 25 leading into the lower part of the filtering tower 8. Vapors and gases are discharged from the separator through pipe 26, which is connected to a condenser 27 having an outlet pipe 28 for delivering the gasoline.

The scrubbing action due to passing the vapors through the bubble caps in the column 5, condenses the heavier fractions from the vapors, which preferably pass off through pipes 23 and 21, as re-cycle stock from one of the lower trays of the tower; this re-cycle stock being mixed with the raw charging stock and again cracked in the units. The cracked gasoline vapors passing off from the top of the bubble tower enter the top of the clay of vapor phase treating tower 8. The vapors entering the top of the tower percolate downward through the fuller's earth and the condensed polymers drain through the perforated cone bottom 15 into the space below where they can be drawn off or be mixed with the re-cycle stock for re-cracking. The vapors then rise upward through the pipe 10 and pass out near the top through the separator 24, where any entrained liquid is removed.

It will be noted from the drawing that the tower 8 is air cooled and that the vapors after filtering through the fuller's earth are caused to rise through the pipe 10 into the collecting header 9 at the top, and the height of this pipe 10 is such that it tends to act as a dephlegmator to condense or knock back any polymers which have passed through the screen 11, with the result that the vapors passing off to the condenser are almost entirely free from all objectionable coloring matter.

In accordance with my invention, it is ordinarily unnecessary to cause the vapors, after passing through the filtering material, to contact with packing material, baffle plates, bubble trays or the like, so that the passage 10 may be unrestricted.

It will be observed that the cracking plant and rectifier forming part of the present invention, are of standard construction and that I have placed my improved filtering tower at the outlet end of the rectifier.

Instead of cracking the oil before introducing it into the rectifying column, I may distill it in the ordinary way without cracking the same.

As before stated, my improved apparatus and process are also applicable to the desulphurizing of hydrocarbon vapors. For instance, I have found, in working on raw gasolines produced from crude oil containing a high percentage of sulphur, that this gasoline will also contain a high percentage of sulphur. By filtering this gasoline through fuller's earth in the vapor phase a great deal of this sulphur can be removed, according to my process, leaving the filtered gasoline readily susceptible to simple caustic wash for the production of a non-corrosive product.

Specifically, I have filtered gasoline produced from Amarilla crude oil according to my process and reduced the sulphur content from .093% to .043%. The reactions that occur in this process are difficult to explain, but the sulphur is present in the crude either as organic sulphur compound or as hydrogen sulphide, and my explanation of the reactions that occur is that the fuller's earth acts as a catalyst on the sulphur compounds, converting them into other compounds such as hydrogen sulphide and mercaptans, which are later readily combined with caustic solutions or other treating agents such as sodium plumbite or sodium or calcium hypochlorites to form sulphides or oxidized sulphur compounds insoluble in gasoline and readily drawn off, after settling to leave a stable non-corrosive gasoline.

I have also found that the fuller's earth, as a catalyst, polymerizes the unsaturated hydrocarbons contained in the gasoline into such form that these polymers readily combined with the sulphur compounds, and a part of the sulphur is removed with the polymers.

The fuller's earth actually adsorbs a portion of the sulphur compound.

When the process and apparatus are used for decolorizing or desulphurizing or both, I prefer to use a reflux agent at the top of the rectifying column. I may, for instance, pump an oil distillate or similar composition into the top tray of the tower through a pipe 29, this distillate being derived from an outside source, and being usually made up of off-colored distillates requiring re-running. The feeding of this reflux liquid may be accomplished by a small pump, thermostatically controlled by the temperature at the head of the tower.

It will be understood from the foregoing, that my method and apparatus may be employed for the removal of sulphur compounds and other organic sulphur compounds from vapors produced by cracking or fractionally distilling hydrocarbon oils. My theory is that the organic compounds, particularly those containing sulphur are the ones which affect the coloring and stability of the gasoline, and it is by the removal of these compounds, rather than by mechanical filtering that the desired color and stability are secured.

From the above description, it is believed that the construction of my apparatus and the steps of the process may be clearly understood, and I am aware that changes may be made in the details disclosed without departing from the spirit of the invention as expressed in the claims.

What I claim and desire to secure by Letters Patent is:

1. In a process of the character described, distilling hydrocarbon oil and contacting the resulting vapors with a filtering material having the catalytic characteristics of fuller's earth, and located at a point remote from the place of distillation whereby polymerization of the vapors takes place, then passing the vapors upwardly through an unrestricted passage of sufficient length to cause polymers mechanically entrained with the vapors, to be detrained and flow downwardly in the passageway counter-current to the rising vapors, causing said polymers to drain through the filtering material, and condensing the vapors discharged from the upper end of the passageway.

2. In a process for treating hydrocarbon vapors, passing said vapors downwardly through a mass of material having the catalytic characteristics of fuller's earth, surrounding an elongated unrestricted passageway whereby polymerization of the vapor takes place, and thus heating said passageway, then passing the vapors upwardly through the passageway to cause polymers mechanically entrained with the vapors to be detrained and flow downwardly in the passageway counter-current to the rising vapors, causing said polymers to drain through the catalytic material, discharging the polymers from the lower end of said mass, and condensing the vapors discharged from the upper end of the passageway.

JAMES M. WADSWORTH.